United States Patent [19]
Jarmy

[11] 3,938,191
[45] Feb. 10, 1976

[54] ROTARY DATA BASE WITH AIR BEARING

[75] Inventor: Howard I. Jarmy, San Francisco, Calif.

[73] Assignee: The Singer Company, New York, N.Y.

[22] Filed: Aug. 21, 1974

[21] Appl. No.: 499,339

[52] U.S. Cl. ............................. 360/102; 346/108
[51] Int. Cl.$^2$ .................................... G11B 70/08
[58] Field of Search ............. 360/102; 340/173 LM; 346/108

[56] References Cited
UNITED STATES PATENTS

| | | | |
|---|---|---|---|
| 3,029,416 | 4/1962 | Quade | 360/102 |
| 3,030,452 | 4/1962 | Uritis | 360/102 |
| 3,229,047 | 1/1966 | Simpson | 340/173 CT |
| 3,549,827 | 12/1970 | Willcox | 340/173 LM |

*Primary Examiner*—Terrell W. Fears
*Attorney, Agent, or Firm*—Paul Hentzel; James C. Kesterson

[57] ABSTRACT

A document containing analog data is vacuum retained on a transparent rotating drum. A data illumination head and a light responsive reading head are mounted on a carriage which moves parallel to the axis of rotation. The heads transversely scan the existing analog data as the drum rotates generating a digital new data base. The carriage is supported on air bearings that constrain movement in pitch, yaw and roll, and is driven by a precision lead screw. The sample rate of the read head is controlled by a step accumulator in response to a shaft encoder which monitors the drum rotation.

21 Claims, 8 Drawing Figures

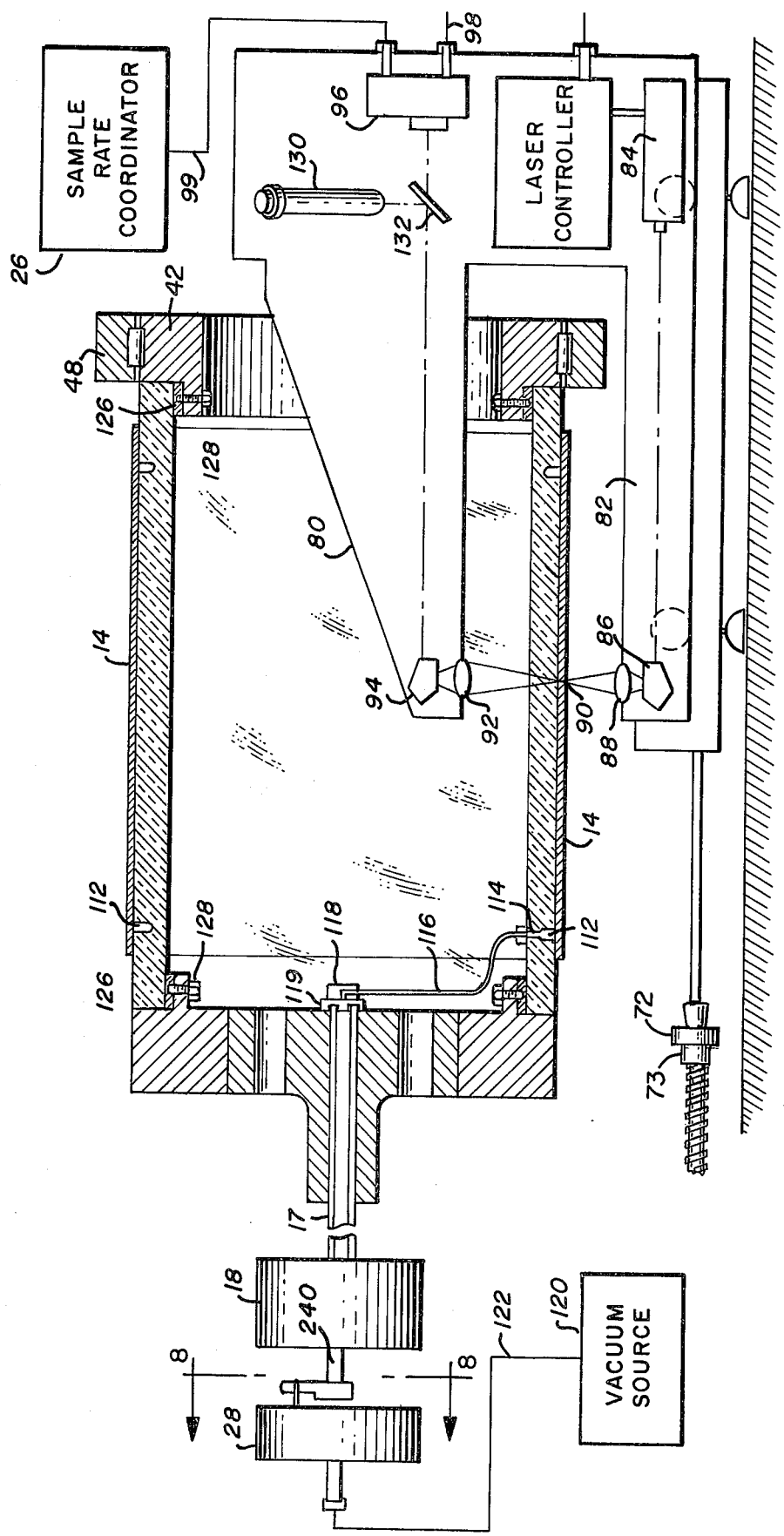
Fig_2

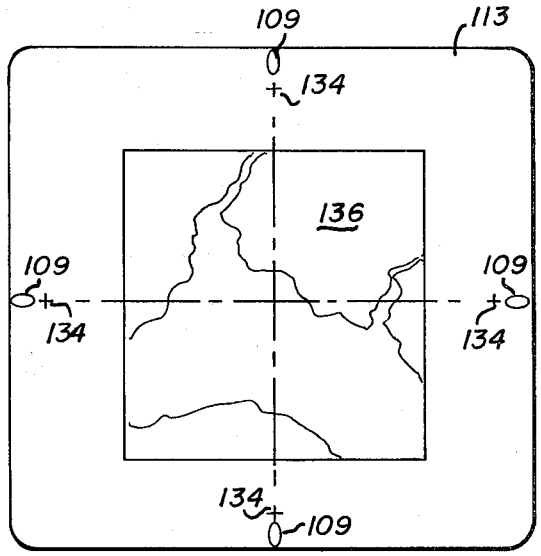
Fig_3
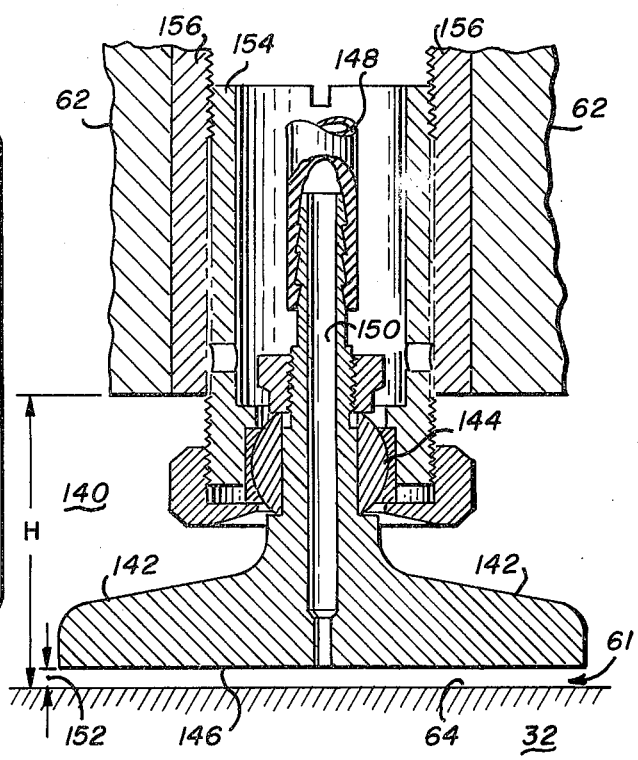
Fig_4
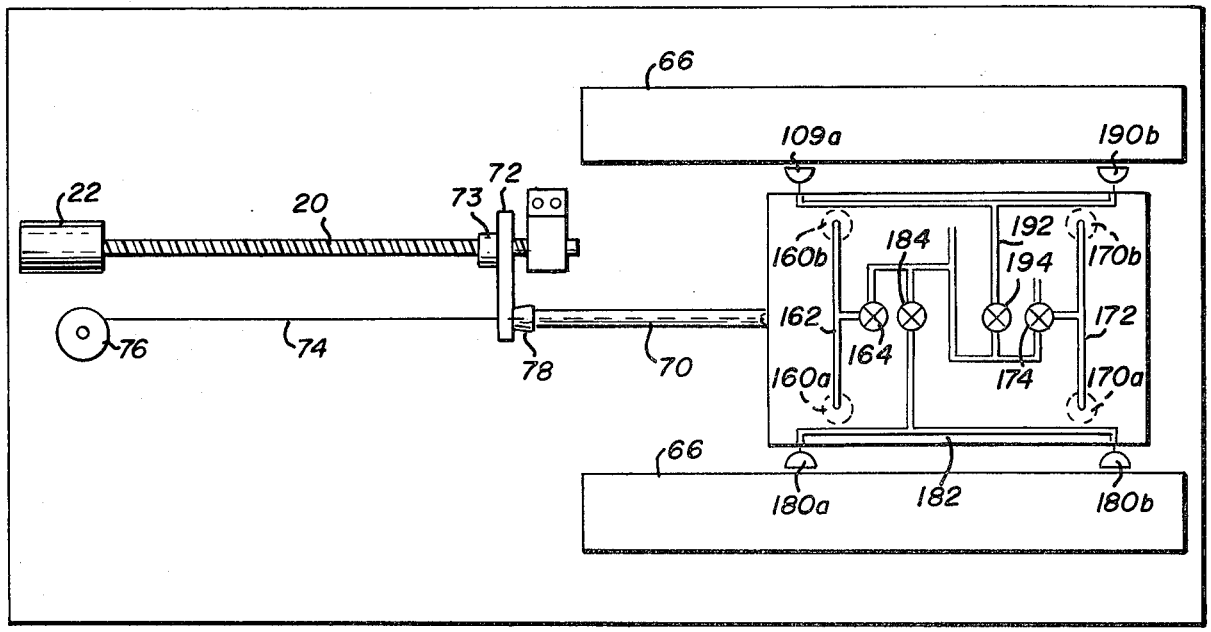
Fig_5

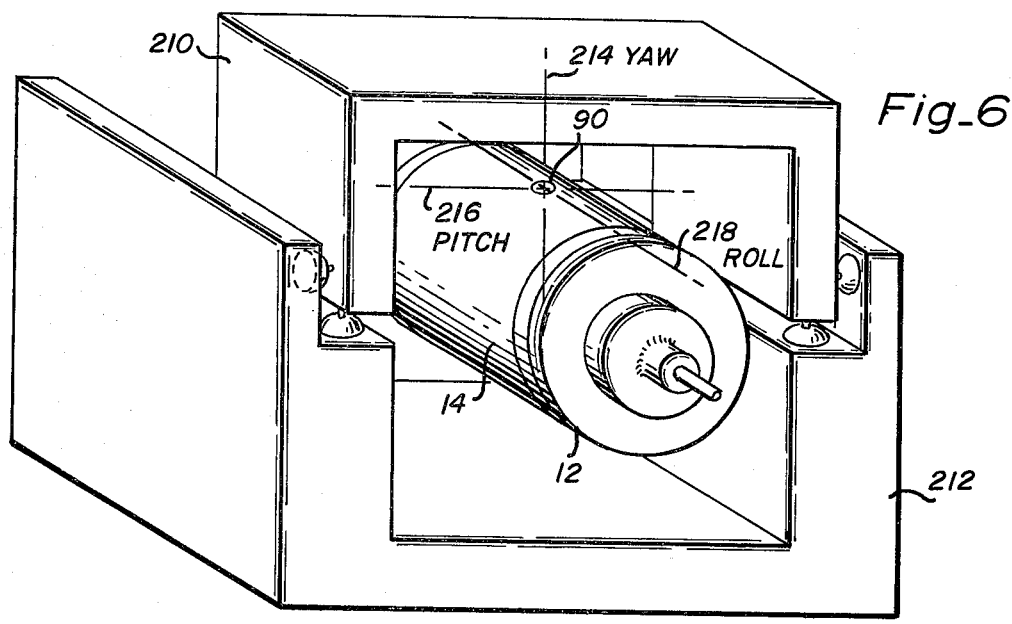
Fig_6
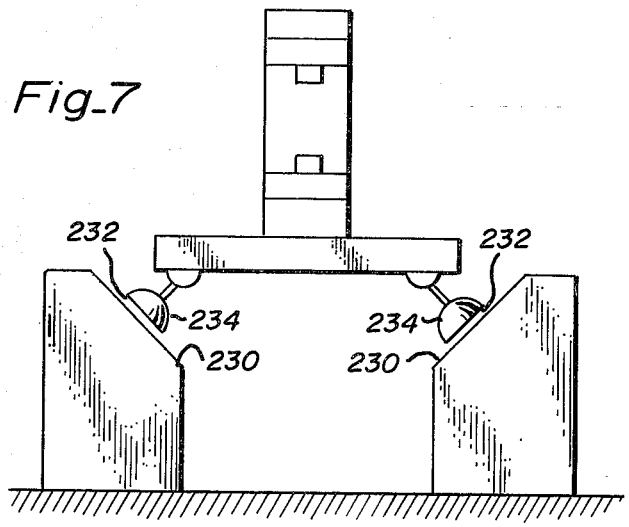
Fig_7
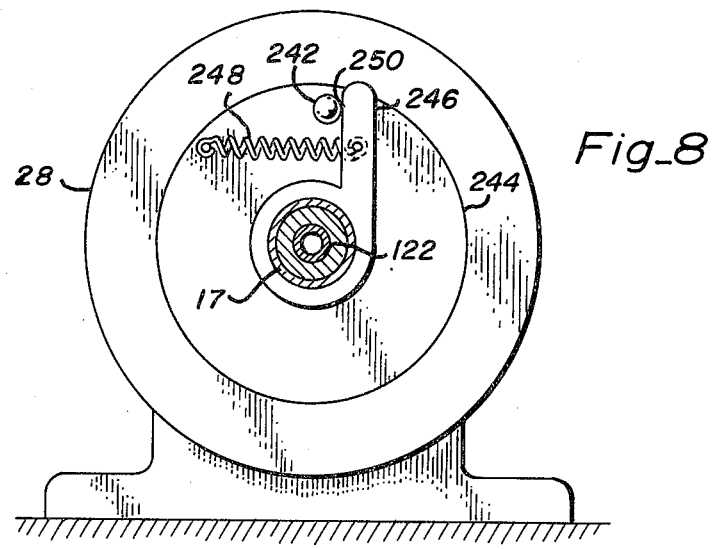
Fig_8

ROTARY DATA BASE WITH AIR BEARING

FIELD OF THE INVENTION

This invention relates to a data convertor system, and more particularly to a large system having rotary and traverse scanning motions.

DESCRIPTION OF THE PRIOR ART

Heretofore rotary digitizers have employed mechanical slides or rolling contact mounted carriages to provide the traverse scan motion. The moving surface to stationary surface contact transmits externally generated vibrations into the carriage causing distortions in the data reading.

It is therefore an object of this invention to provide a rotary digitizer in which the traverse bearing isolates the carriage from external mechanical disturbances.

Further, the surfaces of the traverse motion were never completely free of warpage and machine error. These small imperfections generated low intensity high frequency vibrations within the traverse carriage which introduced tiny errors in the data reading. In a high resolution device such tiny errors are unacceptable.

It is, therefore, another object of this invention to provide a high resolution rotary digitizer in which mechanical imperfections in the traverse bearing structure do not cause sampling error.

The mechanical contact of the traverse surfaces of the prior art digitizers caused standing friction which inhibited increments of traverse motion. The traverse force required to overcome this standing friction caused a start-up jerk which required a finite time interval to subside or stabilize. Damping devices were sometimes required to absorb the start-up disturbance.

It is, therefore, a further object of this invention to provide a rotary digitizer having a traverse bearing not subject to standing friction.

The contact of the traverse surfaces introduced motion friction resulting in mechanical wear. The closely machined surfaces ultimately deteriorated until the resolution requirements could not longer be maintained.

It is, therefore, an additional object of this invention to provide a rotary digitizer in which the traverse motion is free from moving friction and operational wear.

The pitch, yaw, roll and height position of the prior art carriage were fixed at the installation of the carriage, or were adjustable during standstill or non-scan conditions. The tilt position of the carriage could not conveniently be adjusted or reset during operation of the digitizer.

It is, therefore, still another object of this invention to provide a rotary digitizer in which the pitch, yaw, roll, and height characteristics of the traverse motion may be adjusted during operation of the digitizer.

The alignment retaining forces of the prior art traverse motion were also fixed at installation. No adjustment was convenient for changing the mechanical response time of the traverse system during operation. Oscillations generated during operation could not be tuned out. Errors in traverse motion alignment could not be compensated for during operation.

It is, therefore, still a further object of this invention to provide a rotary digitizer in which the spring rate or response time of the traverse motion system may be adjustable during operation.

Briefly, these and other objects are accomplished by providing a hollow rotating drum for retaining the existing data base. The bearing at one end of the drum has a large bore permitting an arm of a traverse carriage to enter the drum. The carriage has another arm extending outside of the carriage. The arms carry an illumination head and a reading head which scan the surface of the existing data base as the drum rotates and the carriage traverses. An air bearing is provided between the carriage and a guide surface to establish a friction free, vibration isolating traverse motion.

BRIEF DESCRIPTION OF THE DRAWING

Further objects and advantages of the present data convertor and the operation thereof will become apparent from the following detailed description taken in conjunction with the drawings in which:

FIG. 2 is a side view in section along lines 2—2 of FIG. 1 showing the internal structure of the drum and the optical system mounted on the carriage;

FIG. 3 is a plan view of an aerial photograph data medium showing fiducial marks and registration slots;

FIG. 4 is an elevation view in section of a swivel air pad used in the air bearing of FIG. 1;

FIG. 5 is a top view in section along lines 5—5 of FIG. 1;

FIG. 6 is an isometric view of a zero deviation embodiment showing the scanning spot positioned at the intersection of the pitch, yaw, and roll axes;

FIG. 7 is a front view of a bevel guide surface embodiment in which the vertical and lateral forces are provided by a single air thrust on each bevel surface; and FIG. 8 is an end view taken along lines 8—8 of FIG. 1 showing the coupling between the encoder and the drum drive shaft.

FIG. 1 shows a data convertor system 10 with a rotating transparent drum 12 for supporting a data medium 14. The original data on medium 14 is read by scanner 16 as drum 12 is turned on a shaft 17 by a drum drive 18.

Figure 1:
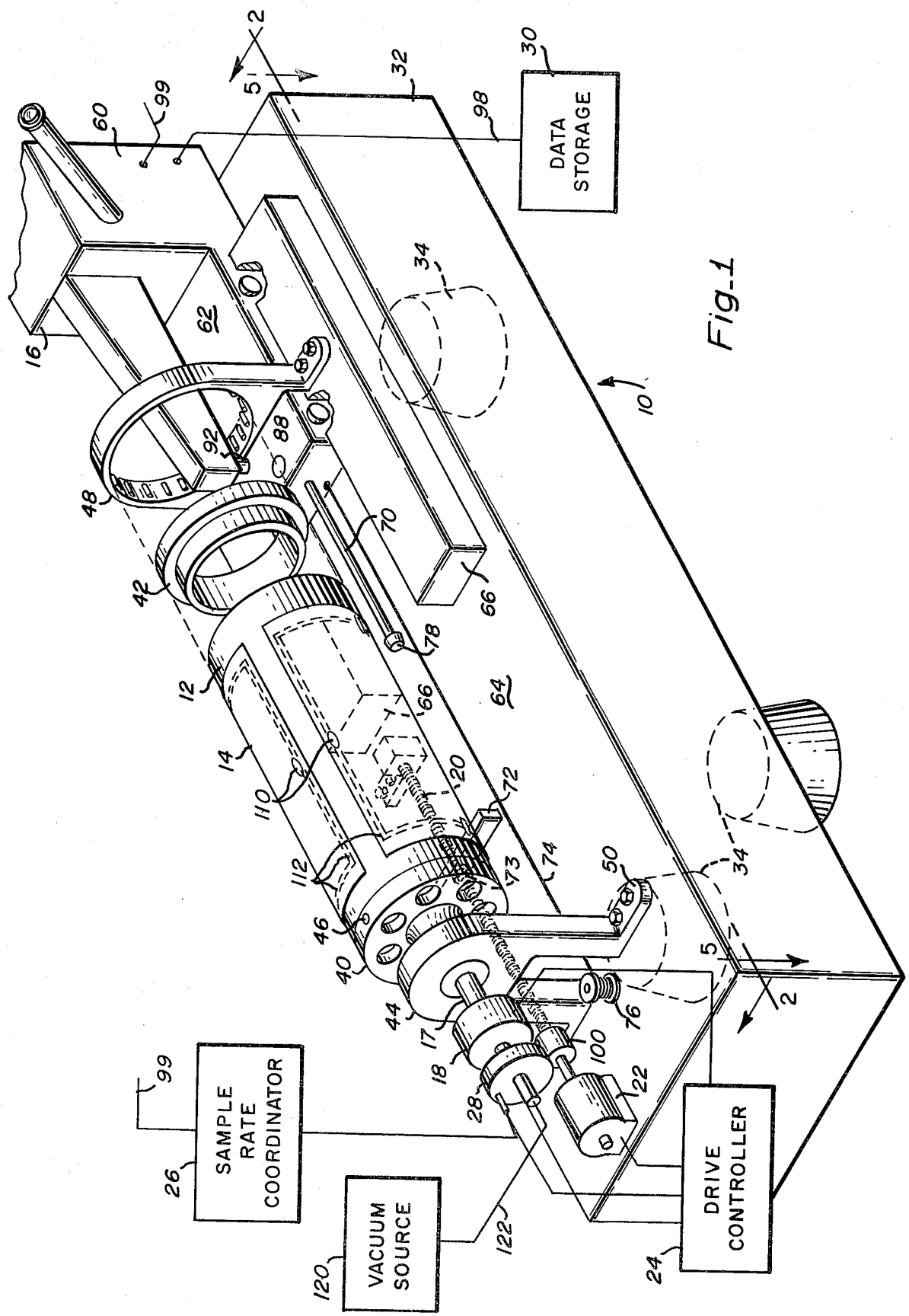
FIG. 1 is an isometric view of the complete rotary digitizer system.

Scanner 16 advances axially along a lead screw 20 incrementally turned by a stepping motor 22. A drive controller 24 coordinates the radial and axial motion between medium 14 and scanner 16; and an accumulator device 26 periodically activates scanner 16 in response to an encoder 28 which is mounted on the axis of drum 12 for monitoring the rotation thereof. The existing data base of medium 14 is read and processed in digital form as a new data base into a storage device 30. The entire convertor system 10 is mounted on a suitable foundation such as a granite slab 32 which is vibration-isolated by a servo-controlled three-point suspension air cusion 34.

Drum 12 of the FIG. 1 example is a glass cylinder 33 inches long having an outside diameter of 15.25 inches for supporting a data film 35 × 35 having a data area of 30 × 30 inches. Larger drums may be provided for larger data films. A cylinder wall thickness of 0.50 inches is sufficient to rigidly support medium 14. Drum 12 is preferably mounted on end bells 40 and 42 which fit snugly into the ends of drum 12. Driving end bell 40 supports the front end of glass drum 12 and rests on a suitable support structure such as duplex front bearings 44 which radially bears the drum weight, but prevents axial movement. Pin 46 cooperates with aligned notches along the interface of driving bell 40 and the front edge of drum 12 to transmit driving torque and reduce slippage. The rear of drum 12 is supported by driven end bell 42 which rests on a wide bore rear bearing 48 shown in the broken away portion of FIG. 1. Rear end bell 42 idles and does not require a pin and notch feature. Rear bearing 48 is preferably a radial type which allows axial movement of bell 42 for accommodating thermal expansion of drum 12. The drum, end bells, and bearings are supported above slab 32 by front and rear legs 50, providing room thereunder for the lower arm of scanner 16. Scanner 16 is mounted on an optical carriage 60, which is vertically supported and laterally aligned by an air slide bearing 62. Air slide bearing 62 has large diameter swivel-mounted air pads threaded into it. The swivel pads 140 bear vertically against table surface 64 and lateral guide blocks 66. The swivel features reduces the manufacturing tolerances of the air pads (See FIGS. 4 and 5). Table surface 64 and the side surfaces of guide blocks 66 are maintained to a flatness of 0.000150 inch. The large diameter pads provide the vertical and alignment forces required, and in addition integrate out small variations in the straightness and flatness of table surface 64 and guide surfaces 66. Carriage 60 advances along lead screw 20 as stepping motor 22 is activated by controller 24. A pusher rod 70 extends from carriage 60 and contacts a nut or rider flange 72 which moves on lead scrw 20. Rider 72 has a threaded collar 73 which engages lead screw 20 over a length of 2 inches in the FIG. 1 embodiment to reduce thread error. The rider-pushrod contact is maintained as rider flange 72 moves along lead screw 20 by a suitable spring device such as constant torque spool 76 which is connected to carriage 60 by a cable 74. The free-abutting contact between pushrod 70 and rider flange 72 prevents the transmission of lateral pitch and yaw forces into carriage 60. A shock absorber 78 positioned between pushrod 70 and rider flange 72 protects the system during film-loading and maintenance operations. Cable 74 preferably extends parallel to the traverse motion and axis of rotation, and is positioned with respect to the pushrod 70 so as to prevent lateral displacement (yaw motion) of carriage 60.

FIG. 2 shows an upper arm 80 of carriage 60 extending into drum 12 through large bore bearing 48, and a lower arm 82 extending under drum 60. Lower arm 82 carries a suitable light source such as laser 84 providing a horizontal laser beam incident onto a penta-prism 86 which refracts the beam upwards into a lens 88. Lens 88 focuses the laser beam onto data medium 14 forming an illuminated scanning spot 90 having a diameter consistent with the resolution of convertor 10. Light spot 90 moves axially on data medium 14 as carriage 60 advances. The rotation of drum 12 simultaneously with this slow axial movement causes spot 90 to scan the entire surface of the data area on medium 14. For each scanning rotation of drum 12, stepping motor 22 turns a miniumum of one step, causing lead screw 20 to axially advance and traverse carriage 60 a small increment which defines the traverse resolution of convertor 10. If desired, one or several rotations of drum 12 may elapse between scanning rotations to permit carriage 60 to advance and stabilize. The diameter of light spot 90 is preferably no greater than the traverse step of carriage 60, and the rotational distance between data samples.

The laser beam passes through data medium 14 acquiring data modulation on an analog or greyscale basis in accordance with the opacity or transparency of medium 14. The darker the data image on medium 14, the lower becomes the intensity of the modulated beam. If the original data medium 14 has a binary-two state base, the beam will have two intensities of modulation, a high intensity for the clear areas of medium 14 and a low intensity for the dark areas. The beam continues upward through the cylinder wall of drum 12 striking read lens 92 which is mounted on upper arm 80 directly above spot 90. Read lens 92 focuses the modulated beam into a read penta-prism 94 which refracts the beam horizontally through end bell 42 toward the main portion of carriage 60.

A light sensor 96 receives the modulated laser beam and processes the data samples from medium 14 through an output cable 98 to data storage 30 during the scanning rotations. The new data base in storage 30 may have grey-scale states or may be binary two state. Light sensor 96 is responsive to sample rate coordinator 26 at control input 99 ot pass data samples at predetermined arcuate intervals of rotating drum 12. The arcuate interval is the distance between data samples on medium 14 and may be controlled by adjusting the step increment or COMPARE condition in sample rate coordinator 26 as described in copending application Ser. No. 499,273 by Ansis Pommers and Robert Lotz entitled, "Sample Rate Coordinator and Data Handling System" filed herewith and assigned to the present assignee. The sampling interval defines the resolution of the new data base passing into data storage 30 along the circumferential dimension of the old data base of medium 14. The resolution along the axial dimension may be controlled by adjusting the stepping rate of motor 22 which advances carriage 60 along lead screw 20. Allowing more steps between each scanned rotation causes larger axial steps which reduce the resolution of the new data base. The axial step may be reduced by reducing the stepping rate of motor 22, or by changing the linkage ratio in gear box 100 which may be included in the system to connect stepping motor 22 to lead screw 20. Both the axial resolution (stepping rate) and the rotational resolution (sample rate) of the new base may be reduced to increments smaller than the residual vibration of drum 12. The resolution limitation of data convertor system 10 is determined by the tolerance of bearings 44 and 48, the stiffness of legs 50, the mass of slab 32, and the isolation of air cushion 34.

In the example of FIGS. 1 and 2, the resolution is limited to about ½ mil. In this example, drum 12 is 15¼ inches in diameter and turns at four revolutions per minute leaving 160 microseconds for sampling each ½ mil circumferential step. Higher resolving power may be obtained by providing suitable supporting structures, and faster sampling circuitry.

In order to obtain the highest resolution, it is preferred that the laser beam pass through data medium 14 prior to passing through the cylinder wall of drum 12. The beam is optically diffused slightly by the glass in the cylinder wall, and also to some extent by the film thickness of data medium 14. This diffusion causes a certain arbitrariness in the size of spot 90. It is preferred that this lack of definition of spot 90 occurs on the digital or read side of medium 14, and that the analog or illumination side have a crisp finely focused spot capable of resolving the detail of medium 14. Data medium 14 could clearly be mounted around the inside surface of drum 12, in which case the laser head would be mounted inside drum 12 proximate medium 14 and the read head mounted outside for the optimum resolution.

In the example of FIGS. 1 and 2, data medium 14 is mounted around the outside of drum 12 and positioned by registration slots 109 on film 14 and registration pins 110 preferably, pins 110 are mounted on double eccentric 111 to permit precise positioning of film 14. Data medium 14 is retained in place by a peripheral vacuum groove 112 which urges the edges or sealing border 113 of medium 14 (See FIG. 3) against the surface of drum 12. The vacuum is provided to groove 112 through a vacuum port 114 leading through the cylinder wall into the interior of drum 12. Port 114 connects to a short vacuum hose 116 which communicates with a rotating elbow vacuum connector 118 positioned inside drum 12 on the end of hollow turning shaft 17. Elbow 118 is caused to rotate by driver 119 so as to relieve hose 116 of strain. A vacuum line 122 extending through the interior of hollow shaft 17 connects at one end to rotating elbow 118 and at the other end to a vacuum source 120. Additional ports 114 and hoses 116 may be provided in drum 12 for distributing the vacuum force throughout peripheral groove 112. A vacuum force of 5 to 10 psi is suitable for 35 inch × 35 inch films, and may varied to accommodate other film sizes and conditions.

After data medium 14 has been mounted on drum 12, visible air pockets may be eliminated by hand squee-geeing them into vacuum groove 112. The presence of air bubbles disturbs the position correspondence between film 14 and the surface of drum 12 introducing error into the new data base. Sub-visible air bubbles differentially migrate slowly toward groove 112 through microscopic channels caused by the surface roughness of drum 12, grain boundaries in film 14, etc.

Once data medium 14 is in intimate contact, drum 12 is checked for alignment. It is preferable that the center line of drum 12 be coaxial with drive shaft 17 and parallel with lead screw 20. If the coaxial condition is not met, drum 12 will wobble destroying the correspondence between the X and Y axis of film 14 and the rotational and traverse scanning motion. If the parallel condition is not met, drum 12 will rotate out-of-round defocussing spot 90 and introducing error in the position of spot 90. Both conditions must be met within the resolution requirement of convertor 10. The alignment is corrected by providing a suitable drum positioning device such as drum shoes 126 mounted in end bells 40 and 42 along the inner surface of drum 12. Shoes 126 are radially positioned by turning adjustment screws 128 accessible from the inside of drum 12 causing drum 12 to tilt into the coaxial-parallel position. Preferably, three aligning shoes 126 are provided spaced about the periphery of each end bell with additional locking shoes to further secure the position of drum 12 after alignment. The alignment of drum 12 may be established and periodically confirmed by observing the size and position of spot 90 from the inside of drum 12 through a bore sight 130. The spot image is provided at sight 130 by a suitable optical device such as a half silvered mirror 132 mounted between read prism 94 and photo sensor 96.

The alignment of X and Y centerline fiducial marks 134 of film 14 (See FIG. 3) also be monitored through bore sight 130. The longitudinal axis is positioned parallel with lead screw 20 by adjusting double eccentrics 111 are of equal eccentricity and provide about ±60 mils to accommodate mechanical skew-error between the positions of fiducial marks 134 and slots 109. Further, eccentrics 11 can accommodate image skew-error between fiducial marks 134 and the X and Y axis of data area 136 on film 14 (See FIG. 3).

FIG. 4 shows a swivel air pad assembly 140 mounted in carriage slide 62 used to establish air bearing convertor 10. A pad member 142 pivots about a swivel joint 144 to maintain the flat pad surface 146 of pad 142 paralel to table surface 64 of slab 32. Air bearing 61 is maintained by air pressure from an air hose 142 extending through slide 62. The air passes downward through a center channel 150 in assembly 140 and then horizontally through an air bearing gap 152 between flat surface 146 and table surface 64. Pad assembly 140 has a threaded cylindrical housing 154 which mates with a threaded cylindrical sleeve 156 cast into carriage slide 62. Assembly 140 may be screwed upward into slide 62 or downward toward slab 32 to adjust the height H of slide 62. Gap 152 is maintained constant by the air rushing therethrough, and turning assembly 140 changes the position of slide 62.

FIG. 5 shows four pairs of swivel air pads for vertically elevating slide 62 and carriage 60 above table surface 64 and laterally positioning slide 62 between guide blocks 66. A first pair of forward vertical pads 160a and 160b are supplied with pressure regulated air through pressure hose 162 from regulator 164. A second pair of rear vertical pads 170a and 170b are supplied with pressure regulated air through pressure hose 172 from regulator 174. Air pads 160 and 170 cooperate to maintain slide 62 in a level position above table 64. Differentially, adjusting the pressure provided by regulators 164 and 174 will vary the pitch of slide 62 and the spacing of the illumination head and read head from the wall of drum 12. The height and pitch of slide 62 may also be controlled by extending or retracting pads 160 and 170. The roll of slide 62 may be adjusted by extending air pads 160a and 170a together or pads 160b and 170b together. A third pair of left lateral air pads 180a and 180b are supplied with pressure regulated air through hose 182 from regulator 184, and a fourth pair of right lateral air pads 190a and 190b are supplied with pressure regulated air throught hose 192 from regulator 194. Differentially adjusting the air pressure provided by regulators 184 and 194 will vary the lateral position of slide 62 and the position of the scanning head and reading head relative to drum 12. The yaw position and the lateral gap may be adjusted by extending or retracting pads 180 and 190. Increasing the air pressure uniformly to lateral pad pairs 180 and 190 will increase the stiffness or response of the lateral air bearing. Carriage 60 together with slide 62 weighs about 400 pounds and a vertical air pressure of about 45 psi is suitable to maintain a one mil vertical gap between the vertical air pads 160 and 170 and table 64. A lateral air pressure of about 40 psi is suitable to maintain the lateral gap which was adjusted to one mil by extending pads 180 and 190. Clearly, other air pressure configurations are possible to provide the pitch, roll, and yaw positioning. For examples, each air pad may be independently pressure adjusted to orient slide 62.

The swivel feature of the air pads permits them to self align with table 64 and lateral sides 66. Flat surface 146 reaches a pressure equilibrium with the opposed bearing surface which constantly shifts in response to imperfections in the bearing surfaces or alignment. The importance of machining tolerances of the bearing surfaces is thus reduced. The swivel pad also accommodates orientation imperfections in casing threaded sleeve 156 into slide 62 and out-of-flat conditions of pad surface 146 by pivoting to maintain a generally uniform gap spacing across pad surface 146.

FIG. 6 shows a zero deviation embodiment of convertor 10 in which carriage base 210 and foundation slab 212 have a spaced configuration permitting spot 90 on drum 12 to appear at the point of zero yaw, zero pitch, and zero roll deviation. The point of zero deviation is the intersection of the yaw axis 214, pitch axis 216, and roll axis 218. As the carriage (not shown) on base 210 traverses parallel to the axis of drum rotation, the focus of zero deviation points forms a line which is parallel to the traverse motion and approximately tangent to the surface of the film 14 on drum 12, and coincides with the axis of roll 218. The zero deviation embodiment minimizes distortions in the new data base produced by spurious movements of base 210.

FIG. 7 shows a single component embodiment employing a pair of beveled guide surfaces 230 for air bearing 232. Both the vertical and lateral components are provided in a single air thrust perpendicular to each surface 230. Bearing 232 can be established and fully controlled as to pitch, yaw and roll positioning by two pairs of air pads 234, one pair thrusting against each bevel surface 230.

FIG. 8 shows a force coupling device 240 connected between shaft 17 and encoder 28 for eliminating lateral bending forces that could damage encoder 28 or create spurious outputs from it. An eccentric pin 242 extending from the input rotor 244 of encoder 28 engages a driving dog 246 mounted on the end of drive shaft 17. As torque motor 18 rotates shaft 17 and drum 12, dog 246 applies a pure linear force against pin 242 which produces a pure torsion force for turning encoder 28. Extraneous bending moments, vibrations and torsion are eliminated from encoder 28. A spring 248 constantly urges dog 246 into contact with pin 242 to negate the effect of any small variations in drive speed. Preferably, pin 242 and dog 246 have circular cross sections permitting them to tangentially engage at universally pivot table point 250. The pivoting action at point 250 prevents the transmission of unwanted moments that would damage encoder 28 and generate false counts.

It will be apparent to those skilled in the art, that various changes may be made in the described convertor system and technique. Accordingly, the scope of the invention should be determined by the wording of the following claims and their legal equivalents.

I claim as my invention:

1. A system for reading an original data base and new data base, comprising:
    an annular member adapted to retain the original data base;
    means for rotatably supporting the annular member;
    rotary drive for turning the annular member on the bearing means about an axis of rotation;
    scanning member for illuminating and reading the original data base;
    traverse drive for establishing relative traverse motion between the members parallel to the axis of rotation by moving at least one of the members;
    guide means for retaining the members in parallel relationship during the traverse motion;
    drive controller for coordinating the rotary drive and traverse drive to scan the desired area of the original data base and establish the desired format of the new data base; and
    air bearing means for spacing the traversely movable member from the guide means during the traverse motion for reducing the friction and vibration coupling therebetween.

2. The system of claim 1, wherein the air bearing means has a vertical component for lifting the traversely movable member and a lateral component for maintaining the spacing between the traversely movable member and the guide means.

3. The system of claim 2, wherein the guide means define a generally horizontal surface and two spaced non horizontal surfaces; and
    the vertical component is provided by air pads mounted on the traversely movable member downwardly directed against the horizontal guide surface, and the lateral component is provided by opposed air pads mounted on the traversely movable member and directed sideways against the spaced non horizontal guide surfaces.

4. The system of claim 3, wherein the air, pressures in the downwardly directed air pads are adjustable to provide height positioning of the traversely movable member.

5. The system of claim 4, wherein the air pressures in the downwardly directed air pads are differentially adjustable to provide pitch positioning of the traversely movable member.

6. The system of claim 4, wherein the air pressure in the downwardly directed air pads are differentially adjustable to provide roll positioning of the traversely movable member.

7. The system of claim 2, wherein the traverse drive moves the scanning member traversely in step increments between rotor scans, and the air bearing reduces mechanical disturbance incident to each stop by minimizing standing friction.

8. The system of claim 7, wherein the traverse drive comprises:
    a threaded lead member;
    means for turning the lead member;
    a threaded rider means mounted on the lead member which abuttingly engages the scanning member, and is displaced along the lead member as the lead member is turned for establishing the traverse motion of the scanning member.

9. the system of claim 8, wherein the means for turning the lead member is a stepping motor for displacing the threaded rider means a predetermined amount for each motor step.

10. The system of claim 9, wherein a cable with one end wound on a constant torque spool is secured at the other end to the scanning member for urging the scanning member into contact with the threaded rider.

11. The system of claim 10, wherein the cable extends parallel to the direction of traverse motion along the center line of the scan member to avoid developing turning moments in the scanning member.

12. The system of claim 7, wherein the annular member is light transparent and is hollow having an inside surface and an outside surface, one surface of which is adapted to retain the original data base;

the scanning member has an inside arm extending into the annular member for scanning the inside surface and an outside arm for scanning the outside surface; and an illumination head is head mounted on one of the arms and a light sensor reading head is mounted on the other arm.

13. The system of claim 12, wherein the outside surface is adapted to retain the original data base, the illumination head is mounted on the outside arm, and the reading head is mounted on the inside arm.

14. The system of claim 3, wherein:

the annular member is a light transparent hollow cylinder;

the scanning member comprises:

an inner support extending into the interior of the hollow cylinder proximate the inside surface thereof, an outer support extending proximate the outside surface of the cylinder, a light source device mounted on one of the supports for illuminating the hollow cylinder, and a light sensitive device mounted on the other one of the supports;

the scanning member is traversely movable and adjustable in pitch, yaw, and roll orientation to position the light device relative to the hollow cylinder and to maintain the traverse motion parallel to the axis of rotation of the hollow cylinder.

15. The system of claim 14, wherein the bearing means include end means at each end of the hollow cylinder, and further include shoe means for engaging the hollow cylinder which shoes are position adjustable for adjusting the tilt or pitch and yaw orientation of the hollow cylinder.

16. The system of claim 14, wherein the hollow cylinder includes selectively positioned double eccentric registration pins adapted to engage registration slots on the original data base for properly orientating the original data base on the hollow cylinder.

17. The system of claim 14, wherein the light source device provides a spot of light which is modulated by the original data base and then detected by the light sensitive device, and which spot is incident on the surface of the hollow cylinder proximate the intersection of the pitch axis, the yaw axis, and the roll axis.

18. The system of claim 4, wherein the air pressure in the laterally directed air pads is adjustable to provide yaw positioning of the traversely movable member.

19. The system of claim 4, wherein the air pads are swivel-mounted to maintain a close clearance with the adjacent guide surfaces.

20. The system of claim 4, wherein the downwardly directed air pads are adjustable in extension to provide pitch and roll positioning of the traversely movable member.

21. The system of claim 4, wherein the laterally directed air pads are adjustable in extension to establish a close clearance with the adjacent guide surfaces.

* * * * *